Oct. 16, 1934.    J. D. JOHNSON    1,977,514
CAR WHEEL
Filed Aug. 21, 1933
Fig-1-
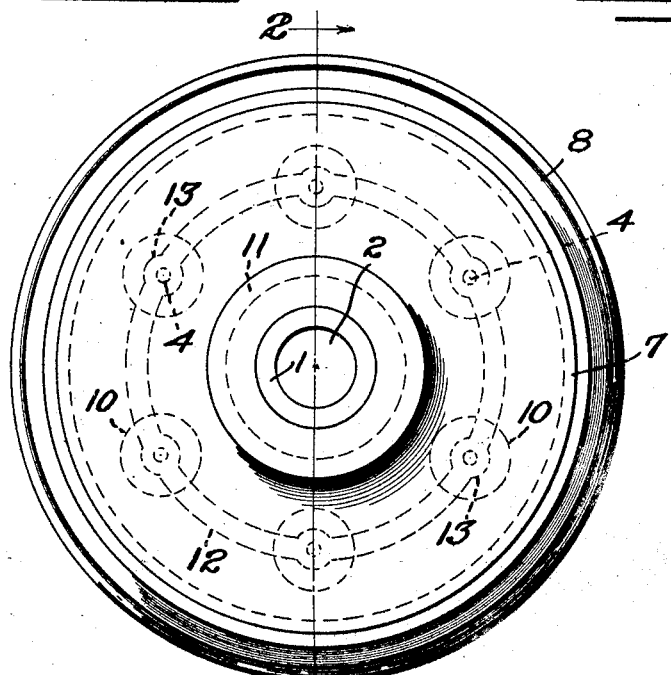
Fig-2-
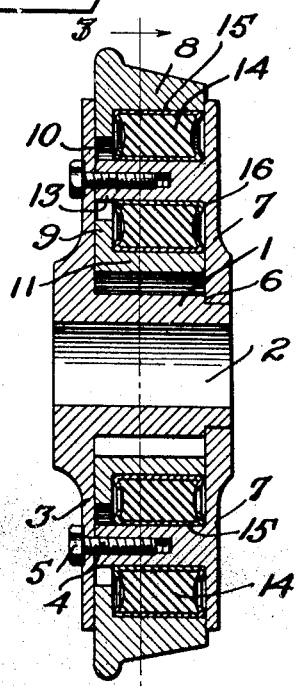
Fig-3-
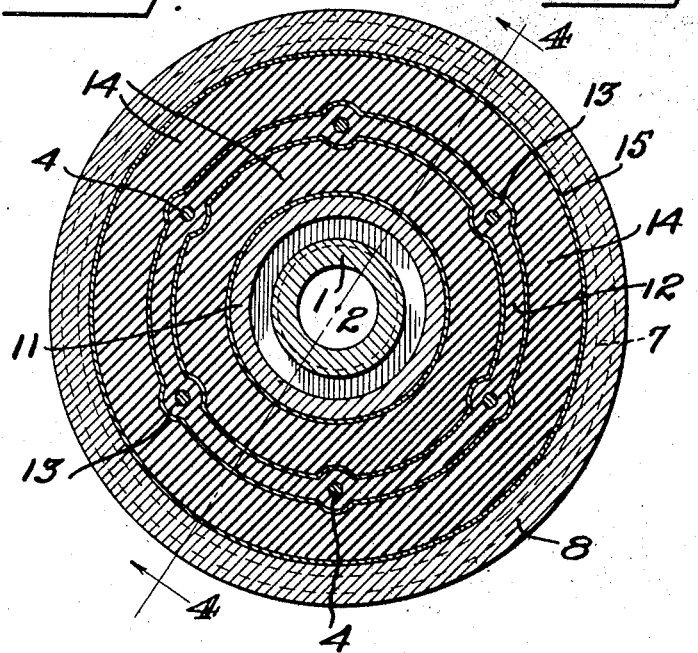
Fig-4-
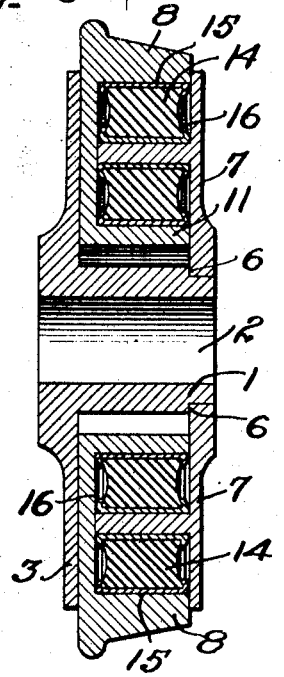
John David Johnson,
INVENTOR
BY Victor J. Evans & Co.
ATTORNEY Patented Oct. 16, 1934

1,977,514

UNITED STATES PATENT OFFICE 1,977,514

CAR WHEEL

John David Johnson, New Haven, Conn.

Application August 21, 1933, Serial No. 686,149

4 Claims. (Cl. 295—11)

This invention relates to resilient railroad rolling stock wheels and has for the primary object the provision of a device of the above stated character which will provide a desired cushion to absorb shocks and jars and thereby materially increasing riding qualities and which will be durable and simple in construction and have an efficient drive between the hub and rim of the wheel without affecting the limited movement necessary between these parts to permit the cushioning action.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a wheel constructed in accordance with my invention.

Figure 2 is a sectional view taken on the line 2—2 of Figure 1.

Figure 3 is a sectional view taken on the line 3—3 of Figure 2.

Figure 4 is a sectional view taken on the line 4—4 of Figure 3.

Referring in detail to the drawing, the numeral 1 indicates a hub provided with a bore 2 for receiving the car axle. A side plate 3 is formed integrally with one end of the hub and is provided with a series of apertures 4 to receive stud bolts 5. The other end of the axle 2 is reduced to form an annular shoulder 6 and mounted upon the reduced portion and abutting the shoulder is a side plate 7. A car wheel rim 8 is slidably received between the side plates and has cast integrally therewith a disc-like plate 9 provided with a series of openings 10 arranged opposite to the apertures 4 that receive the stud bolts 5. The disc-like plate 9 is centrally apertured to permit the passing of the hub 1 therethrough and the walls of the aperture are spaced from the hub. Formed integrally with the disc-like plate 9 at the central opening is an annular flange 11 surrounding the hub between the side plates and arranged with space between its inner wall and outer wall of the hub. An annular flange 12 is formed integrally with the side plate 7 and is arranged between the flange 11 and the wheel rim 8 and has formed thereon projections 13 which extend through the openings 10 and abut the side plate 3 and are provided with screw threaded openings to receive the studs 5 thereby detachably connecting the side plates with the wheel rim and its disc-like plate assembled for limited movement between the side plates.

Annular cushion members 14 are interposed between the wheel rim 8, flange 12 and the latter and the flange 11 and each have their opposite sides concaved. Surrounding each cushion member 14 are steel bands 15 having their edges bent to form flanges 16 lying in the concaved sides of the cushion members. The concaved sides of the cushion members permit the latter to expand. The members 14 as described will absorb shocks and jars between the rim 8 and the hub 1.

While I have shown and described the preferred embodiment of my invention, it will be understood that minor changes in construction, combination and arrangement of parts may be made without departing from the spirit and scope of my invention, as claimed.

Having described the invention, I claim:

1. A wheel comprising a hub, a side plate integral with one end of the hub, a side plate removably mounted on the other end of the hub, a wheel rim received between the plates, a disc-like plate carried by the rim and provided with openings, an annular flange on the disc-like plate and surrounding the hub, a second annular flange on the removable plate and having projections extending through the opening of the disc-like plate, means detachably connecting the second flange with the integral side plate, and cushion means between the rim and the second flange and between the latter and the first flange.

2. A wheel comprising a hub, a side plate integral with one end of the hub, a side plate removably mounted on the other end of the hub, a wheel rim received between the plates, a disc-like plate carried by the rim and provided with openings, an annular flange on the disc-like plate and surrounding the hub, a second annular flange on the removable plate and having projections extending through the opening of the disc-like plate, means detachably connecting the second flange with the integral side plate, cushion members arranged between the rim and the second flange and the latter and the first flange.

3. A wheel comprising a hub, a side plate integral with one end of the hub, a side plate removably mounted on the other end of the hub, a wheel rim received between the plates, a disc-like plate carried by the rim and provided with openings, an annular flange on the disc-like plate and surrounding the hub, a second annular flange on the removable plate and having projections extending through the opening of the disc-like plate, means detachably connecting the second flange with the integral side plate, cushion members arranged between the rim and the second flange and the latter and the first flange, spaced bands between the rim and the second flange and the latter and the first flange with the members arranged therebetween.

4. A wheel comprising a hub, a side plate integral with one end of the hub, a side plate removably mounted on the other end of the hub, a wheel rim received between the plates, a disc-like plate carried by the rim and provided with openings, an annular flange on the disc-like plate and surrounding the hub, a second annular flange on the removable plate and having projections extending through the opening of the disc-like plate, means detachably connecting the second flange with the integral side plate, cushion members arranged between the rim and the second flange the latter and the first flange, spaced bands between the rim and the second flange and the latter and the first flange with the members arranged therebetween, said members having their ends concaved and flanges on the bands and engaging the concaved ends of the members.

JOHN DAVID JOHNSON.